(12) United States Patent
Rodriguez et al.

(10) Patent No.: US 8,850,541 B2
(45) Date of Patent: Sep. 30, 2014

(54) VISUAL AUTHENTICATION AND AUTHORIZATION FOR MOBILE DEVICES

(75) Inventors: Raphael A. Rodriguez, Quincy, MA (US); Julian Spring, Allston, MA (US); Daniel Volovik, Brighton, MA (US)

(73) Assignee: Delfigo Corporation, Boston, MA (US)

( * ) Notice: Subject to any disclaimer, the term of this patent is extended or adjusted under 35 U.S.C. 154(b) by 86 days.

(21) Appl. No.: 13/481,106

(22) Filed: May 25, 2012

(65) Prior Publication Data

US 2012/0304269 A1  Nov. 29, 2012

Related U.S. Application Data

(60) Provisional application No. 61/490,924, filed on May 27, 2011.

(51) Int. Cl.
| | |
|---|---|
| *G06F 7/04* | (2006.01) |
| *G06F 3/045* | (2006.01) |
| *G06F 3/0484* | (2013.01) |
| *G06F 21/36* | (2013.01) |
| *G06F 3/0488* | (2013.01) |
| *G06F 3/0346* | (2013.01) |
| *G06F 3/01* | (2006.01) |

(52) U.S. Cl.
CPC .............. *G06F 21/36* (2013.01); *G06F 3/0484* (2013.01); *G06F 3/0488* (2013.01); *G06F 3/0346* (2013.01); *G06F 3/017* (2013.01)
USPC ............................................. 726/7; 345/174

(58) Field of Classification Search
CPC ....... G06F 21/31; G06F 21/36; G06F 3/0414; H04L 63/12
USPC .................................. 726/7, 28; 345/173, 174
See application file for complete search history.

(56) References Cited

U.S. PATENT DOCUMENTS

| | | | |
|---|---|---|---|
| 5,559,961 A | | 9/1996 | Blonder |
| 5,821,933 A | | 10/1998 | Keller et al. |
| 6,492,979 B1 | * | 12/2002 | Kent et al. ...................... 345/173 |
| 8,046,721 B2 | | 10/2011 | Chaudhri et al. |
| 2002/0029341 A1 | | 3/2002 | Juels et al. |
| 2009/0085877 A1 | | 4/2009 | Chang et al. |
| 2009/0150992 A1 | | 6/2009 | Kellas-Dicks et al. |
| 2009/0284482 A1 | | 11/2009 | Chin |
| 2010/0328265 A1 | * | 12/2010 | Hotelling et al. ............. 345/174 |
| 2012/0256723 A1 | * | 10/2012 | Grover ........................... 340/5.8 |
| 2013/0065564 A1 | * | 3/2013 | Conner et al. ............. 455/414.1 |

* cited by examiner

*Primary Examiner* — Dede Zecher
*Assistant Examiner* — Abdullah Almamun
(74) *Attorney, Agent, or Firm* — Maine Cernota & Rardin

(57) ABSTRACT

A system and method is provided for visual authentication and authorization of a user for mobile touch devices, the system having: a login display on a mobile touch device displaying a visual pattern; a data collection engine whereby touch attributes are obtained from a plurality of user touch events to the mobile touch device with reference to the visual pattern, the touch attributes comprise measured touch attributes and derived touch attributes calculated from the measured touch attributes; an authentication engine whereby the touch attributes are compared to projected user touch attributes derived from user touch attribute values obtained during prior successful logins.

14 Claims, 5 Drawing Sheets

VISUAL AUTHENTICATION AND AUTHORIZATION FOR MOBILE DEVICES

RELATED APPLICATIONS

This application claims the benefit of U.S. Provisional Application No. 61/490,924, filed May 27, 2011. This application is herein incorporated by reference in its entirety for all purposes.

FIELD OF THE INVENTION

The invention relates to user authentication systems, and more particularly, to a visual authentication and authorization system for mobile touch devices.

BACKGROUND OF THE INVENTION

The keyboard event models are inconsistent across different Smartphone and mobile platforms and identifying a dwell time for a key click on a touch screen seems unfeasible at this time because the programmatic UITouch class in Apple iOS, for example, cannot be utilized due to the fact that a keyboard automatically pops up and disables touch events when user tries to type in the iOS. The keystroke capture measurement of a user's typing flight time alone is not distinguishable to succinctly identify an individual, and would therefore offer very limited value in the authentication scheme. Many keystroke algorithms are built around the consistency of dwell values, which is how long a user presses a key, for a particular user. Therefore, the QWERTY keyboard biometrics, especially dwell time, are unsuited to touch screen displays and a color pattern usage is more intuitive for a natural user interaction.

Keystroke algorithms do not utilize features of touch screen devices that could provide further insight in to the identity of the owner. While known systems employ the idea of using graphical and/or touch (gesture) passwords for authentication, they are not known to use the attributes of the particular touch events. Such systems use continuous gestures as passwords, comparing the drawn gesture to previously trained gestures. They do not use discrete touch events, each with a range of characterizing elements.

There are additionally previous patents using discrete touches, but use the touches to perfectly recreate a previous set of selections. For example, selecting a series of points on a displayed photograph or selecting the correct subset from a grid of icons. The user is granted access if the match is perfect. There is no intelligent confidence factor based on how similar the current login touches are to previous touches.

What is needed, therefore, are techniques for biometrically authenticating a user based on attributes of a sequence of touch events.

SUMMARY OF THE INVENTION

One embodiment of the present invention provides a system for visual authentication and authorization of a user for mobile touch devices, the system having: a login display on a mobile touch device displaying a visual pattern; a data collection engine whereby touch attributes are obtained from a plurality of user touch events to the mobile touch device with reference to the visual pattern, the touch attributes comprise measured touch attributes and derived touch attributes calculated from the measured touch attributes; an authentication engine whereby the touch attributes are compared to projected user touch attributes derived from user touch attribute values obtained during prior successful logins.

Another embodiment of the present invention provides such a system wherein the visual pattern further comprises decoy regions.

A further embodiment of the present invention provides such a system wherein the touch attributes comprise a touch attribute selected from the group consisting of exchange, intensity, and globularity.

Yet another embodiment of the present invention provides such a system wherein the visual pattern is a color grid.

A yet further embodiment of the present invention provides such a system wherein the visual pattern is a color wheel.

Still another embodiment of the present invention provides such a system wherein the visual pattern comprises a custom key arrangement.

A still further embodiment of the present invention provides such a system wherein the data collection engine is configured to collect device attributes selected from the group of device attributes consisting of host name, device type, serial number, International Mobile Equipment Identity (IMEI), electronic serial number (ESN), integrated circuit card identification (ICCID), modem firmware, device unique ID, name of device, model, system version, screen resolution, IP Address, Time Zone, GPS position, and compares the device attributes to device attributes of the user stored in the system.

Even another embodiment of the present invention provides such a system embodiment of the present invention provides such a system wherein the projected user touch attributes are averages of the user touch attribute values during prior successful logins.

An even further embodiment of the present invention provides such a system wherein the projected user touch attributes are regression analysis outputs of the user touch attribute values during prior successful logins.

Still yet another embodiment of the present invention provides such a system wherein at least one user touch event in the plurality is discrete.

One embodiment of the present invention provides a method for the authentication of a user of a system, the method having: requiring the user to enter a sequence of touch events to a touch display displaying a visual pattern; comparing the sequence of touches to a stored touch pattern; capturing a plurality of measured touch attributes; calculating a plurality of derived touch attributes; comparing the derived touch attributes to projected values for the touch attributes of the user; and allowing at least limited access by the user to the system if the derived touch attributes are consistent with the projected values.

Another embodiment of the present invention provides such a method further having prompting a user to select a user touch pattern sequence.

A further embodiment of the present invention provides such a method further having prompting a user to enter the user touch pattern sequence a plurality of times so as to train the system to authenticate the user.

Yet another embodiment of the present invention provides such a method wherein the derived touch attributes comprise exchange.

A yet further embodiment of the present invention provides such a method wherein the derived touch attributes comprise intensity, Still another embodiment of the present invention provides such a method wherein the derived touch attributes comprise globularity.

A still further embodiment of the present invention provides such a method wherein at least one touch event in the sequence of touch events is discrete.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
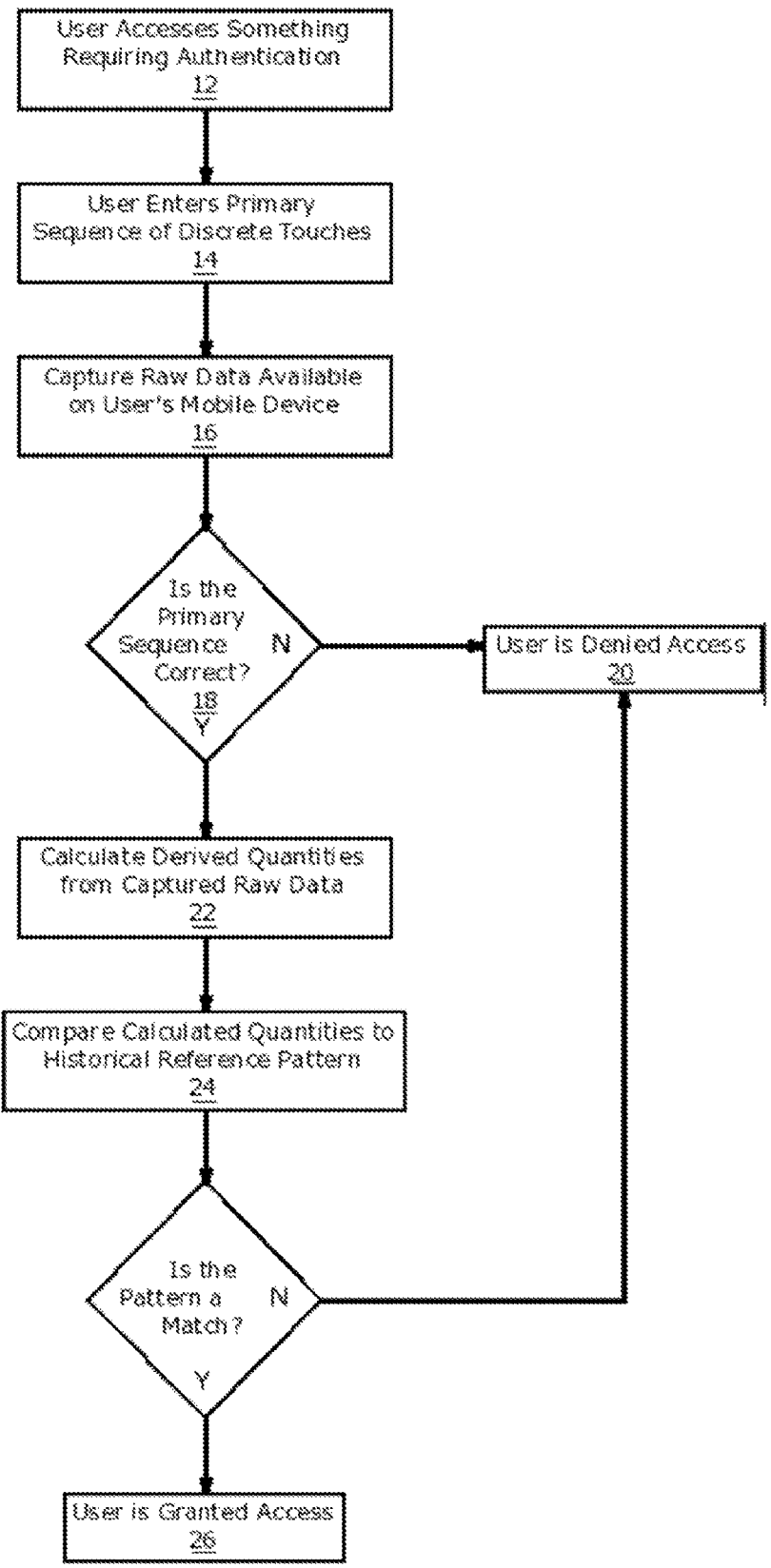
FIG. 1 is a flow chart illustrating a visual authentication and authorization system for mobile devices configured in accordance with one embodiment of the present invention.

As illustrated in the attached figures, a functional flow representation of one embodiment of the present invention implemented on a mobile native architecture or app like Apple iOS or Android. In such an embodiment, a new and innovative touch pattern identifying a user is supplied as an alternative to the QWERTY Keyboard biometric analysis. In one such embodiment the pattern may be a color pattern, while those skilled in the art will appreciate that other visual cues or images may be used to elicit a response from the user. A color pattern idea is especially useful in a Smartphone scenario because of the following:

The system configured according to one embodiment will not misbehave in scenarios like, when the user is traveling, walking, driving or doing some other "work or bodies in motion" and using the mobile touch device simultaneously. A Keyboard biometric pattern based analysis in these cases would have yielded inconsistent values; identifying or authenticating a user would have been problematic.

Figure 2:
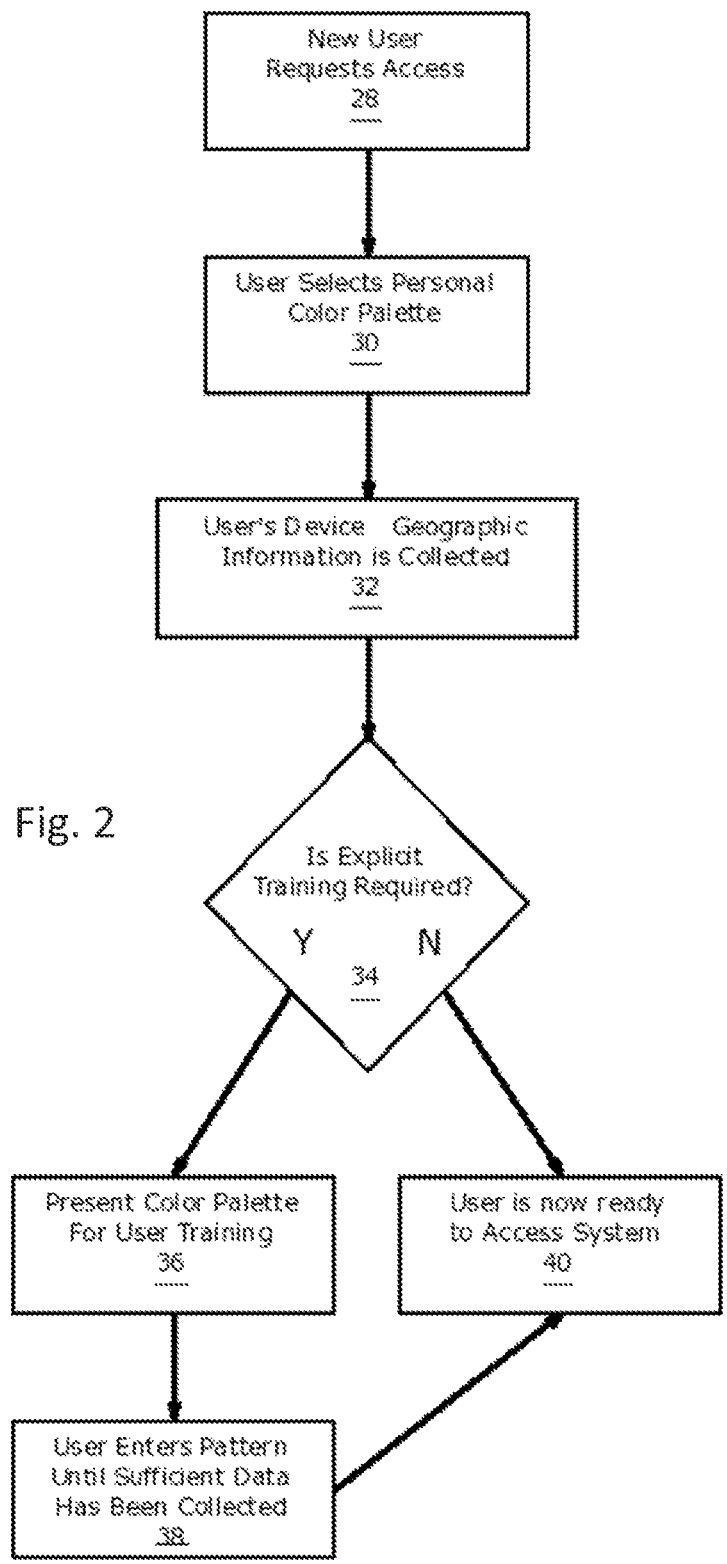
FIG. 2 is a flow chart illustrating a user enrollment and training sequence for use in a visual authentication and authorization system for mobile devices configured in accordance with one embodiment of the present invention.

In embodiments of the present invention having touch Pattern analysis there will be changes involved in the functional flow and integration as compared to the existing systems. In such a system, illustrated in FIG. 1, a primary sequence is entered and initiated as a user accesses something requiring authentication 12 in which a user is prompted to enter a "password-like" sequence of touches to the screen 14. Each touch event in the sequence may comprise contact of the user with the display at one or more point. In one embodiment each touch event may be discrete, that is, being a contact that is substantially non-moving in the x-y coordinate plane of the display. Raw data or measured quantities or measure touch attributes are collect while the user enters the data 16. The pattern is tested against a stored pattern 18 and if the sequence is inaccurate, user access is denied 20 without further biometric touch analysis. Visual patterns displayed by the device may include solid color fields, icons, images, photo, geometric patterns, animations or videos, or simulation of device turnoff. In instances where the sequence is correct, further analysis is conducted during which derived quantities are calculated from measured touch attributes 22. Measured and derives quantities are then compared to projected values derived from prior successful logins 24. While in one embodiment the projected value may be an average of all previous login, in other embodiments a small sample or subset of logins could be used. In a further embodiment, the projected value may use a regression analysis of past logins. If the measured and derived quantities are consistent with projected values, the user is allowed access 26 but is otherwise denied access 20.

Where a user has not been previously enrolled or is opening a new authentication account, the new user is prompted to set up the authentication features in a enrollment procedure such as are illustrated in FIG. 2. The user is prompted with the need to access the system 28. The user is then asked to select a touch pattern 30. While the prompt may be any image or pattern, one embodiment of the present invention uses a color palette. Such an embodiment is described for clarity. In an embodiment where a color palette is the prompt, a palette is selected by the user 30, during the process of selecting a palette, the Device, and Geographic (such as global positioning data) attributes are recorded 32.

Once enrolled, a user may either be prompted to train the device to recognize the user or allowed access while the touch pattern recognition is itself only be activated once sufficient data has been collected. The decision as to whether training is required, may, in embodiments designed for enterprises be made without consultation of the user, while in consumer embodiments, the user may be allowed to decide if they consider training necessary for their own security requirements. The embodiment illustrated in FIG. 2 is shown as a consumer embodiment. In such an embodiment the user decides if training of the system is required 34. If it is, the user is prompted to repeatedly enter the touch pattern 36. Once the user enters a number of iterations of the touch pattern 38 and reaches an iteration threshold completing the training. The number of iterations in an iteration threshold may in some embodiments be set by the user or be pre-defined by the system. If training is either declined or the threshold iterations have been reached, the user is allowed access 40.

As illustrated in FIG. 1, where a user is subject to touch pattern recognition requirements, measured data or measured touch attributes are collected from the touch pattern submitted as the primary sequence. Examples of measured touch attributes, which may be used in various embodiments are provided in Table 1. As noted some of these items will be more readily useful in the context than others.

TABLE 1

| Measured Quantities | Android | iOS |
| --- | --- | --- |
| Touch start time | yes | yes |
| Touch end time | yes | yes |
| X coordinate | yes | yes |
| Y coordinate | yes | yes |
| Size | yes | no |
| Pressure | yes | no |
| Touchmajor | yes | no |

TABLE 1-continued

| Measured Quantities | Android | iOS |
|---|---|---|
| Touchminor | yes | no |
| Orientation of touch | yes | no |
| X accelerometer | yes | yes |
| Y accelerometer | yes | yes |
| Z accelerometer | yes | yes |
| X orientation (of device via gyroscope) | yes | yes |
| Y orientation (gyroscope) | yes | yes |
| Z orientation (gyroscope) | yes | yes |

Examples of additional derived quantities or characteristics are provided in Table 2.

TABLE 2

| Derived Quantities | Definition | Description |
|---|---|---|
| Dwell | end(event)-start(event) | The duration of each individual touch event. |
| Flight | start(next event)-end(event) | The time between each individual touch event. |
| <x> | Average x-coordinate of event | Average horizontal position of each individual touch event. |
| <y> | Average y-coordinate of event | Average vertical position of each individual touch event. |
| δx | difference between x coordinates of successive events | The difference in horizontal position between successive touch events. |
| δy | difference between y coordinates of successive events | The difference in vertical position between successive touch events. |
| <δx> | average of δx | The average horizontal position difference between successive touch events. |
| <δy> | average of δy | The average vertical position difference between successive touch events. |
| Location | $\sqrt{[(x - <x>)^2 + (y - <y>)^2]}$ | The distance from a particular touch and the average location of that touch event. |
| Exchange | $\sqrt{[(\delta x - <\delta x>)^2 + (\delta y - <\delta y>)^2]}$ | The difference in location between successive touch events compared to the expected difference in location. |
| Intensity | Time series of pressure sampled repeatedly during touch event | How hard the screen is being touched during throughout an individual touch event. |
| Globularity | Spatial extent of Touch Event | The total area of the touch screen being touched during an individual touch event. |
| X-force | Time series of x accelerometer sampled repeatedly during event | The X direction acceleration of the mobile device during an individual touch event. |
| Y-force | Time series of y accelerometer sampled repeatedly during event | The Y direction acceleration of the mobile device during an individual touch event. |
| Z-force | Time series of z accelerometer sampled repeatedly during event | The Z direction acceleration of the mobile device during an individual touch event. |
| X-motion | Time series of x orientation | The component of device orientation in the X direction during an individual touch event. |
| Y-motion | Time series of y orientation | The component of device orientation in the Y direction during an individual touch event. |
| Z-motion | Time series of z orientation | The component of device orientation in the Z direction during an individual touch event. |
| Active shift | Initial acceleration and subsequent motion along direction perpendicular to and into screen | The initial acceleration and subsequent movement caused by pressing on the screen during a touch event. |
| Reactive shift | Reactive acceleration and subsequent motion along direction perpendicular to and out of screen | The slowdown and movement back to the original device position once a particular touch event is over. |

In one embodiment, each iteration of the touch pattern allows further data collection and further refines the systems profile of a particular user allowing for greater accuracy in identification.

Figure 3:
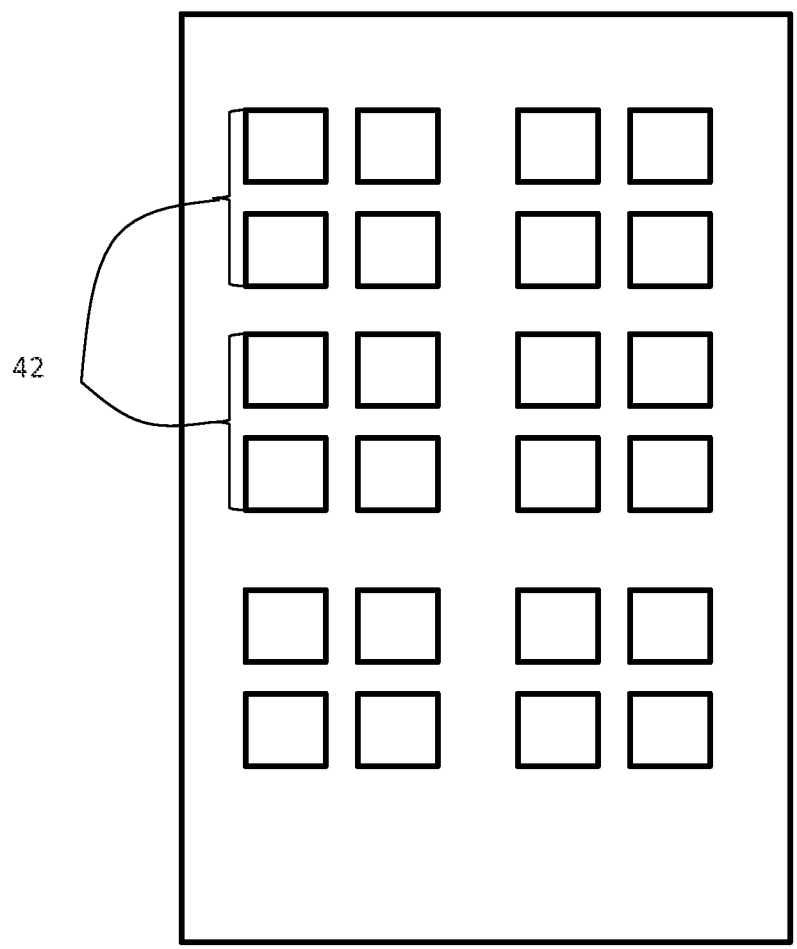
FIG. 3 is a block diagram illustrating a display pattern of visual authentication and authorization system for mobile devices configured in accordance with one embodiment of the present invention in which a plurality of color pallets are presented to the user in which the color pallet access code is obscured.
Figure 4:
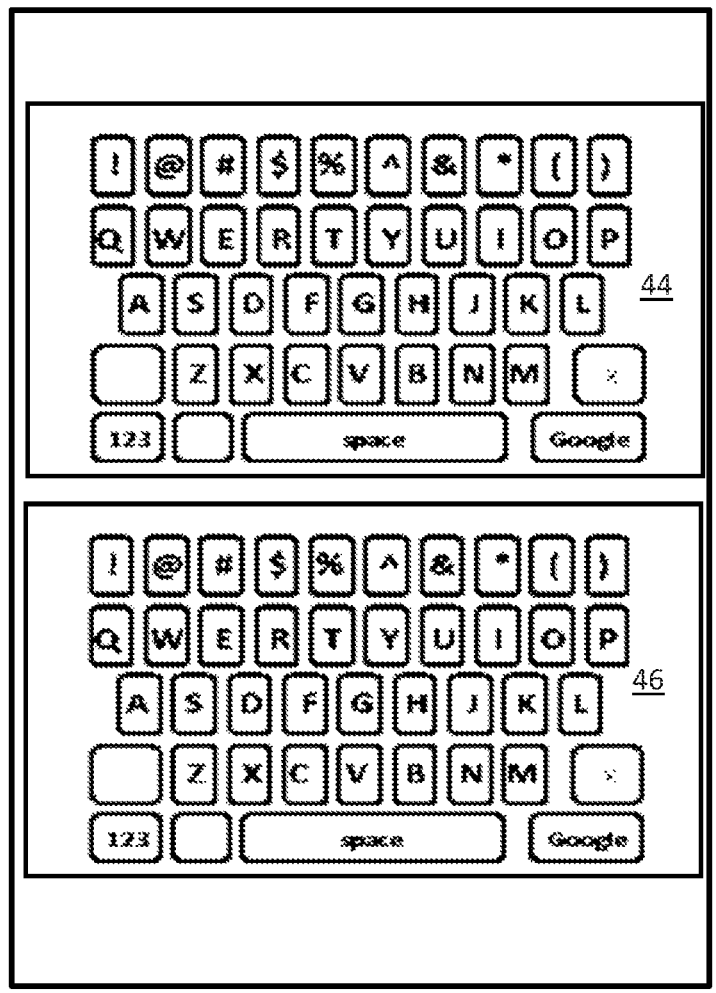
FIG. 4 is a block diagram illustrating a visual authentication and authorization system for mobile devices configured in accordance with one embodiment of the present invention with colorized QWERTY keyboards.
Figure 5:
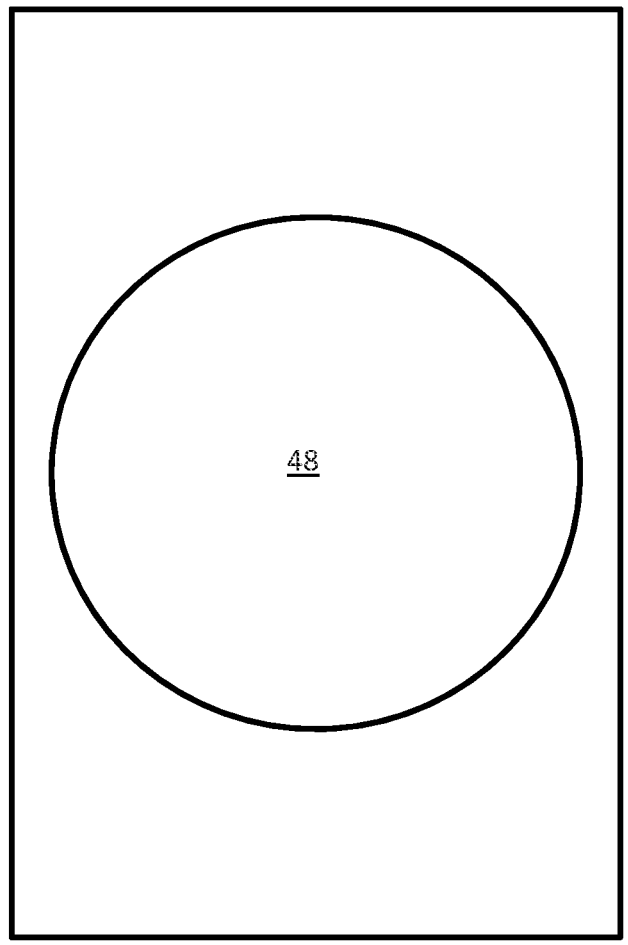
FIG. 5 is a block diagram illustrating a visual authentication and authorization system for mobile devices configured in accordance with one embodiment of the present invention with colors disposed in a color wheel.

In alternative embodiments such as that of FIG. 3 a series of palettes 42 may be offered in the login, one of which would contain the 4 color "pin". Alternatively, as in FIG. 4 a QWERTY capability may be offered in one of two colors 44, 46 doubling the number of possible combinations for each password. As in FIG. 5, a color wheel 48 may be used. A color wheel could be equipped with any number of possible colors increasing the number of possible combinations.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

We claim:

1. A system for visual authentication and authorization of a user for mobile touch devices, the system comprising:
    a login display on a mobile touch device displaying a visual pattern;
    a data collection engine whereby a plurality of touch attributes is obtained from a plurality of user touch events to said mobile touch device with reference to said visual pattern, said plurality of touch attributes comprises measured touch attributes and derived touch attributes calculated from said measured touch attributes, said plurality of touch attributes comprising exchange, intensity, and globularity;
    an authentication engine whereby said touch attributes are compared to projected user touch attributes derived from user touch attribute values obtained during prior successful logins.

2. The system of claim 1 wherein said visual pattern further comprises decoy regions.

3. The system of claim 1 wherein said visual pattern is a color grid.

4. The system of claim 1 wherein said visual pattern is a color wheel.

5. The system of claim 1 wherein said visual pattern is a picture.

6. The system of claim 1 wherein said visual pattern comprises a custom key arrangement.

7. The system of claim 1 wherein said data collection engine is configured to collect device attributes selected from the group of device attributes consisting of host name, device type, serial number, International Mobile Equipment Identity (IMEI), electronic serial number (ESN), integrated circuit card identification (ICCID), modem firmware, device unique ID, name of device, model, system version, screen resolution, IP Address, Time Zone, GPS position, and compares said device attributes to device attributes of said user stored in said system.

8. The system of claim 1 wherein said projected user touch attributes are averages of said user touch attribute values during prior successful logins.

9. The system of claim 1 wherein said projected user touch attributes are regression analysis outputs of said user touch attribute values during prior successful logins.

10. The system of claim 1 wherein at least one user touch event in said plurality is discrete.

11. A method for the authentication of a user of a system, said method comprising:
    requiring said user to enter a sequence of touch events to a touch display displaying a visual pattern;
    comparing said sequence of touches to a stored touch pattern;
    capturing a plurality of measured touch attributes;
    calculating a plurality of derived touch attributes comprising intensity, exchange, and globularity;
    comparing said derived touch attributes to projected values for said touch attributes of said user; and
    allowing at least limited access by said user to said system if said derived touch attributes are consistent with said projected values.

12. The method of claim 11 further comprising prompting a user to select a user touch pattern sequence.

13. The method of claim 12 further comprising prompting a user to enter said user touch pattern sequence a plurality of times so as to train said system to authenticate said user.

14. The method of claim 11 wherein at least one touch event in said sequence of touch events is discrete.

\* \* \* \* \*